May 1, 1962 W. E. FRITZ 3,032,670
SYNCHRONOUS MOTOR
Filed Dec. 19, 1958

INVENTOR.
William E. Fritz
BY
W. E. Finken
His Attorney

United States Patent Office 3,032,670
Patented May 1, 1962

3,032,670
SYNCHRONOUS MOTOR
William E. Fritz, Rochester, N.Y., assignor to General Motors Corporation, Detroit, Mich., a corporation of Delaware
Filed Dec. 19, 1958, Ser. No. 781,602
7 Claims. (Cl. 310—164)

This invention pertains to synchronous motors, and particularly to an improved rotor construction for a self-starting synchronous motor of the inductor type.

In my earlier application Serial No. 722,887, filed March 21, 1958, a self-starting synchronous motor of the inductor type is disclosed including pole faces of rectangular configuration. The stator includes a plurality of equiangularly spaced teeth constituting the pole faces, and the rotor comprises a pair of pole plates, each pole plate having spaced pairs of circumferential pole teeth. Adjacent rotor poles are of like magnetic polarity and are spaced apart twice the angular spacing of the stator poles. In order to assure self-starting, the angular displacement between adjacent rotor poles of opposite polarity is three times the pole pitch of the stator poles.

This type of motor including a rotor with an axially magnetized permanent disc magnet has exceptionally high starting and running torques at rated line voltage, for instance 115 volts. However, it has been observed that at lower line voltages, for instance 85 volts, with the center lines of the rotor poles aligned with the center lines of the stator poles, the starting of the motor is erratic. The reason for the erratic starting at lower line voltages appears to be due to the fact that the force of magnetic attraction or repulsion between the stator and rotor has only a small component in the tangential direction when the center lines of the rotor poles are aligned with the center lines of the stator poles. The present invention relates to an improved rotor construction which starts irrespective of the potential of the line voltage.

Accordingly, among my objects are the provision of an improved permanent magnet rotor assembly for an inductor type synchronous motor; the still further provision of a self-starting synchronous motor which will be operative irrespective of variations in line voltage; and the still further provision of an inductor type synchronous motor wherein one set of poles, either stator or rotor, has a trapezoidal configuration and the other set of poles has a rectangular configuration.

The aforementioned and other objects are accomplished in the present invention by sloping one edge of each pole in either the rotor or stator set whereby upon energization of the motor, the center of magnetic attraction or repulsion is shifted to the sloping side of the pole faces. Specifically, the stator includes inner and outer pole members which are secured to opposite sides of an energizing winding. Each stator pole member has an equal number of equiangularly spaced teeth, or poles, extending axially therefrom. The poles of one stator member are disposed between the poles of the other stator member to form a set of stator poles arranged circularly about an axis.

The rotor comprises a pair of pole plates and an axially magnetized permanent disc magnet located centrally within the stator and rotatably journalled on a shaft supported in the motor housing. Each pole plate of the rotor is formed with circumferentially spaced pairs of pole teeth which extend axially in opposite directions and circumscribes the disc magnet. The rotor stator is designed so that two poles of like polarity are disposed in side by side relationship, the angular spacing between these rotor poles being twice the pole pitch of the stator poles. The angular displacement between adjacent rotor poles of opposite polarity is three times the pole pitch of the stator poles.

In the present invention, as shown in the disclosed embodiment, the rotor poles are of trapezoidal configuration, that is one edge of each rotor pole slopes so that the pole roots have a greater width than the pole tips. However, it is to be understood that this specific embodiment is only exemplary, inasmuch as the stator poles can be of trapezoidal configuration with rectangular rotor poles and the same results can be obtained. By utilizing one set of trapezoidal poles, higher tangential force components are achieved to obtain reliable starting irrespective of variations in the line voltage. In addition, by utilizing one set of trapezoidal poles and one set of rectangular poles, during running operation the rotor rotates at a more uniform speed since the sloping edges of the poles reduce the abrupt change of torque when the rotor poles pass the stator poles. Since the rotor can rotate in either direction depending upon the polarity of the alternating current signal the instant the motor is energized, the direction control disclosed in my aforementioned copending application is preferably embodied in the instant motor construction.

Further objects and advantages of the present invention will be apparent from the following description, reference being had to the accompanying drawings, wherein preferred embodiments of the present invention are clearly shown.

Figure 1:
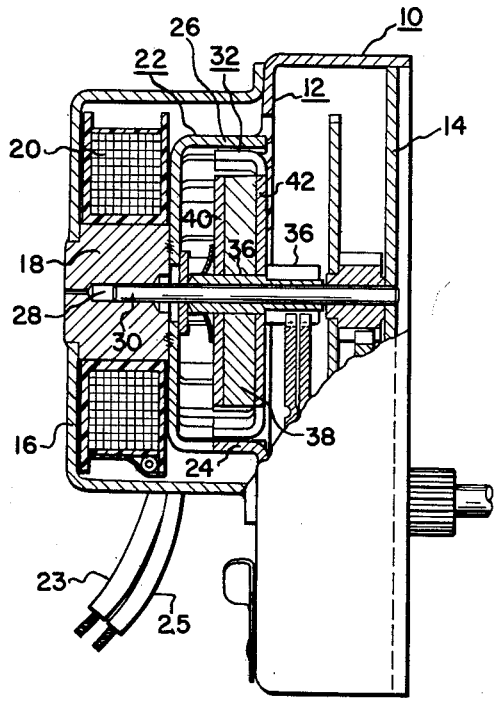
FIGURE 1 is a view partly in section and partly in elevation of a synchronous motor constructed according to this invention.

With particular reference to FIGURE 1, a synchronous motor is shown including a gear housing 10 formed of magnetic material, the central portion thereof constituting the outer pole member 12 of the stator. The gear housing 10 is closed at one end by a cover 14 suitably secured thereto, the other side of the gear housing being closed by a cup-shaped member 16 of magnetic material which is attached thereto by means of welds. A core 18 of magnetic material is centrally located within the cup-shaped member 16 and is firmly attached thereto such as by staking, as indicated. A coil 20 is positioned around the core 18, the lead wires 23 and 25 of the coil being adapted for connection to a suitable source of alternating current having a normal line voltage of 115 volts.

An inner stator pole member 22 is secured to the core 18 by welds, as indicated. The outer pole member 12 has an annular row of angularly spaced axially extending teeth 24 and the inner pole member 22 of magnetic material likewise has an annular row of axially extending pole teeth 26. Both of the pole members have equal numbers of pole teeth, and the pole teeth 26 are disposed between the pole teeth 24. In accordance with my aforementioned copending application, the stator poles may be spaced 18° apart, and when the coil 20 is energized the adjacent poles of the stator are of opposite polarity.

Figure 2:
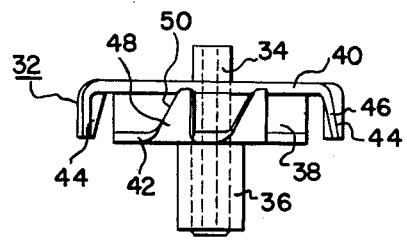
FIGURE 2 is a view in elevation of the improved rotor construction.
Figure 3:
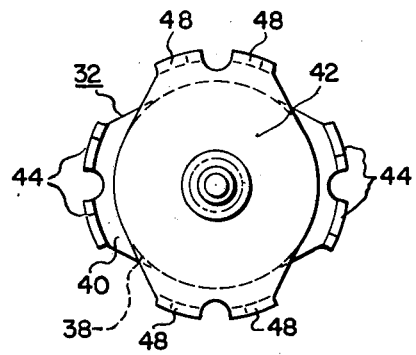
FIGURE 3 is a plan view of the improved rotor construction.

The core 18 has a central portion 28 within which one end of a fixed shaft 30 is disposed. The other end of the shaft 30 is suitably secured to the cover 14. A rotor assembly 32 is centrally located within the stator. As seen in FIGURES 2 and 3 the rotor assembly comprises a centrally located sleeve 34 which is rotatably journalled on the shaft 30. A pinion 36 is attached to one end of the sleeve 34 and an axially magnetized permanent disc magnet 38 is likewise attached to the sleeve 34. The disc magnet 38 is located between a pair of magnetic steel pole plates 40 and 42, the pole plates being secured to the disc magnet 38 in the manner disclosed in my aforementioned copending application.

Figure 4:
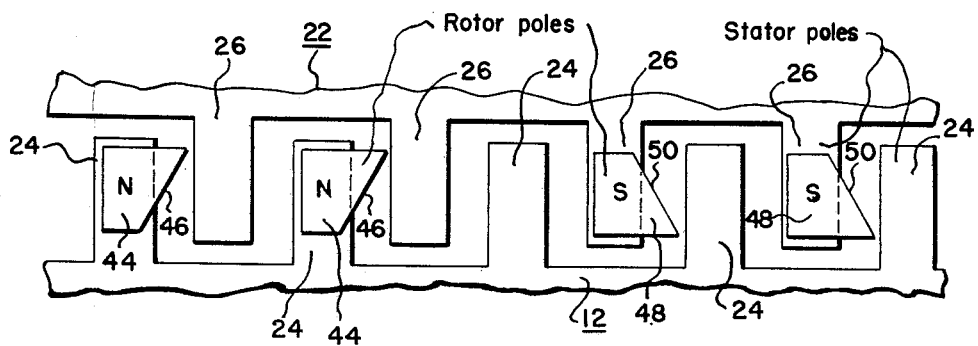
FIGURE 4 is a developed view illustrating the operation of the improved synchronous motor construction.

The pole plate 40 is formed with two diametrically opposed spaced pairs of pole teeth 44 which are bent at right angles to the plate 40. The teeth 44 form salient poles of the same magnetic polarity, and as shown in FIGURES 2 and 4 are of trapezoidal configuration. That is, the roots of the teeth 44 have a greater width than the tips thereof by virtue of the sloping side 46. The pole plate 42 likewise has two sets of diametrically opposed spaced teeth 48 bent at right angles to the plate 42 in a direction opposite to that of the one direction of teeth 44. The rotor poles 48 are likewise of trapezoidal configuration having sloping sides 50 as indicated in FIGURES 2 and 4. It is to be noted that the sides of the rotor poles 44 and 48 opposite the sloping sides 46 and 50, respectively, define right angles with the roots and tips of their respective poles, and thus the rotor poles may be said to have a right-angled trapezoidal shape. The root portions of the rotor poles 44 and 48 are wider than the stator poles 24 and 26 as clearly shown in FIGURE 4. The pole teeth 44 and 48 present arcuate surfaces which are uniformly spaced from the arcuate surfaces of the stationary pole teeth 26 and 24 thereby defining between the stator and rotor pole teeth a uniform annular air gap.

As alluded to hereinbefore there is a definite relationship between the pole pitch of the stator and the pole pitch of the rotor poles of like polarity and opposite polarity. As disclosed in FIGURE 4, the adjacent poles on the rotor of like polarity are spaced apart twice the pole pitch of the stator poles, and the adjacent rotor poles of opposite polarity are spaced apart three times the pole pitch of the stator poles. This arrangement assures that the motor will be self-starting upon energization of the coil 20. By utilizing poles of trapezoidal shape on either the rotor or stator in combination with rectangular poles on the other of the stator and rotor, self-starting at low line voltage is achieved since the center of magnetic attraction or repulsion is shifted to the sloping side of the pole teeth. This results in a higher tangential component of the force acting on the rotor so as to assure self-starting. In addition, during running operation, rotation of the rotor is more uniform than in my aforementioned copending application since the sloping edges of the pole teeth tend to reduce the abrupt change of torque during relative rotation between the rotor and stator members.

While the embodiment of the invention as herein disclosed constitutes a preferred form, it is to be understood that other forms might be adopted.

What is claimed is as follows:

1. A self-starting alternating current motor including, cooperable stator and rotor members, the stator having a magnetic structure presenting a plurality of salient poles to the rotor and an alternating current exciting winding for producing alternating fluxes of alternating polarity in the stator poles, the rotor comprising a magnetic structure presenting salient poles to the stator poles, the rotor poles being spaced from the stator poles to form a uniform annular air gap therebetween, the poles on one of said stator and rotor members being of rectangular configuration, and the poles on the other of said stator and rotor members being of right-angled trapezoidal configuration, the number of stator poles exceeding the number of rotor poles.

2. A self-starting alternating current motor including, cooperable stator and rotor members, the stator having a magnetic structure presenting a plurality of equiangularly spaced salient poles to the rotor and an alternating current exciting winding for producing alternating fluxes of alternating polarity in the stator poles, the rotor comprising a magnetic structure presenting salient poles to the stator poles, adjacent salient poles on said rotor having like polarity being spaced twice the pole pitch of the salient poles of the stator, adjacent salient poles on the rotor having opposite polarity being spaced three times the pole pitch of the salient poles of the stator, the poles on one of said stator and rotor members being of rectangular configuration and the poles on the other of said stator and rotor members being of trapezoidal configuration.

3. A self-starting alternating current motor including, cooperable stator and rotor members, the stator having a magnetic structure presenting a plurality of salient poles to the rotor and an alternating current exciting winding for producing alternating fluxes of alternating polarity in the stator poles, the rotor comprising a magnetic structure presenting salient poles to the stator poles, the rotor poles being spaced from the stator poles to form a uniform annular air gap therebetween, the poles on said stator being of rectangular configuration, and the poles on said rotor being of right-angled trapezoidal configuration, the number of stator poles exceeding the number of rotor poles.

4. A rotor assembly for an alternating current motor comprising, an axially magnetized permanent disc magnet, and a pair of pole plates disposed on opposite sides of said magnet, each pole plate having angularly spaced pairs of adjacent poles of like magnetic polarity, the poles being of right-angled trapezoidal configuration.

5. A rotor assembly for an alternating current motor including, an axially magnetized permanent disc magnet, and a pair of pole plates disposed on opposite sides of said disc magnet, each pole plate having a plurality of angularly spaced pairs of adjacent poles of like magnetic polarity, adjacent poles of opposite polarity being angularly spaced apart a distance greater than the angular space between adjacent poles of like polarity, said poles having a trapezoidal configuration.

6. The rotor set forth in claim 5 wherein the roots of said poles are of greater width than the tips.

7. A self-starting alternating current motor including, cooperable stator and rotor members, the stator having a magnetic structure presenting a plurality of salient poles to the rotor and an alternating current exciting winding for producing alternating fluxes of alternating polarity in the stator poles, the salient poles on the stator being spaced apart equal angular distances, the rotor comprising a magnetic structure presenting salient poles to the stator poles with the rotor poles being spaced from the stator poles to form a uniform annular air gap therebetween, adjacent salient poles on said rotor of like polarity being spaced apart twice the pole pitch of the salient poles on the stator, adjacent salient poles on said rotor having opposite polarities being spaced apart three times the pole pitch of the salient poles on the stator, the poles on said stator being of rectangular configuration and the poles on said rotor being of trapezoidal configuration.

References Cited in the file of this patent

UNITED STATES PATENTS

| 2,212,192 | Howell | Aug. 20, 1940 |
| 2,492,197 | Schellens | Dec. 27, 1949 |

FOREIGN PATENTS

| 845,322 | France | Mar. 8, 1939 |
| 1,090,465 | France | Oct. 20, 1954 |